UNITED STATES PATENT OFFICE.

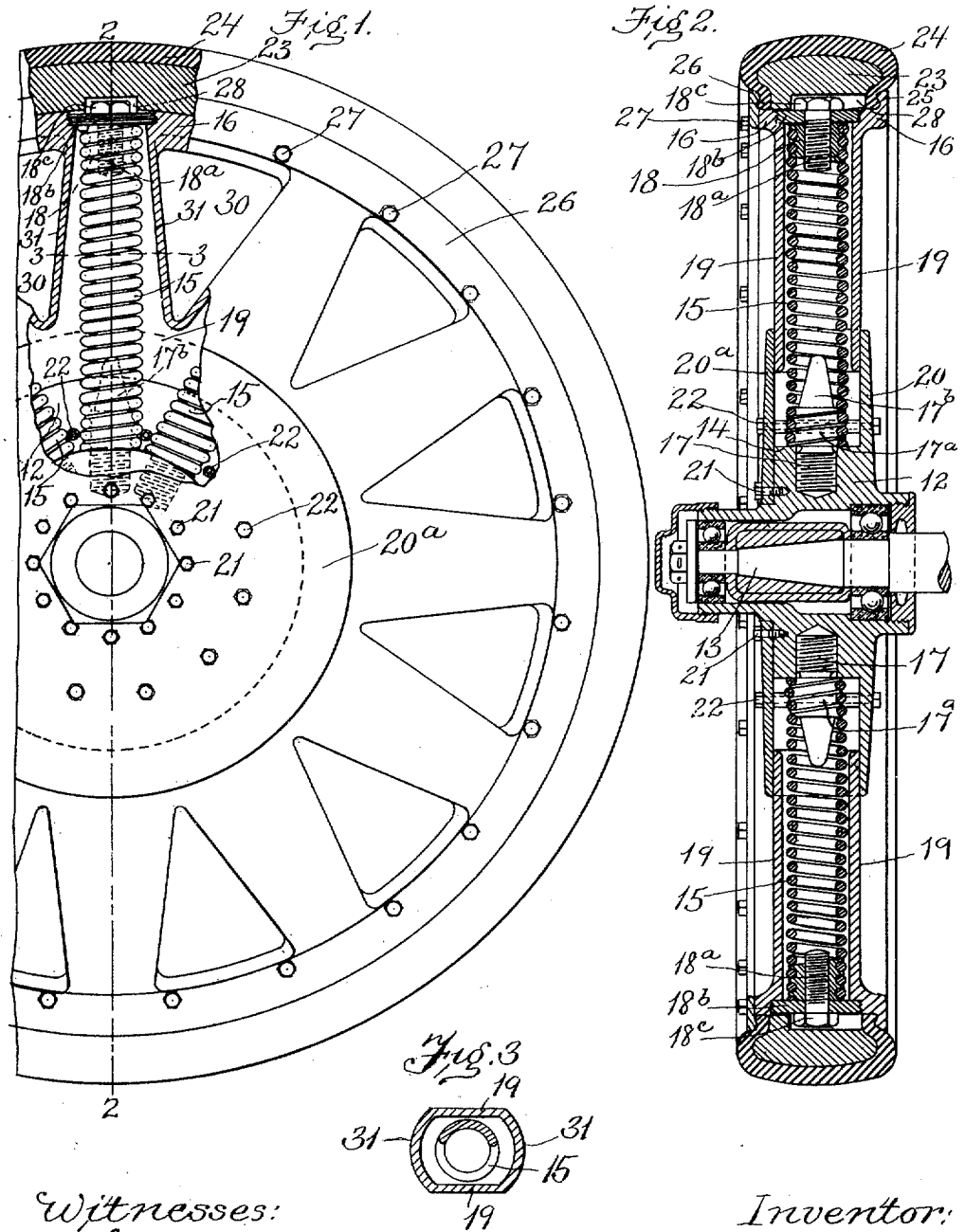

ARTHUR B. CLIFFORD, OF BRAINTREE, MASSACHUSETTS.

RESILIENT WHEEL.

989,567.     Specification of Letters Patent.     Patented Apr. 18, 1911.

Application filed February 2, 1910. Serial No. 541,523.

*To all whom it may concern:*

Be it known that I, ARTHUR B. CLIFFORD, of Braintree, in the county of Norfolk and State of Massachusetts, have invented certain new and useful Improvements in Resilient Wheels, of which the following is a specification.

This invention has for its object to provide a wheel adapted especially for motor vehicles and the like, in which the resilience which is desirable to minimize the effect of jolts and jars is produced by a series of springs interposed between the rim and hub portions of the wheel, the rim being movable relatively to the hub in a plane at right angles to the axis of the wheel, and the springs being positively secured or anchored both to the rim and to the hub, so that the springs above the axis of the wheel are adapted to be extended by the weight of the hub and its load, while the springs below the axis are adapted to be compressed by the same means.

The invention consists in the improvements which I will now proceed to describe and claim.

Of the accompanying drawings, forming a part of this specification,—Figure 1 represents a side elevation of a wheel embodying my invention, parts being shown in section. Fig. 2 represents a section on line 2—2 of Fig. 1, and Fig. 3 represents a section on line 3—3 of Fig. 1.

The same reference characters indicate the same parts in all the figures.

In the drawings,—12 represents a hub adapted to be suitably mounted upon an axle or axle arm, and to rotate either upon the axle, the latter being non-rotary, or with an axle to which the hub may be affixed. In the embodiment of my invention here shown, the hub is adapted to rotate upon a non-rotating axle arm 13, suitable anti-friction bearings being interposed between the hub and the axle arm, these forming no part of my invention. The body portion of the hub is preferably a disk of relatively small diameter having a perimeter 14 adapted to form a bearing for the inner ends of a series of radiating helical springs 15 which are positively secured or anchored to the hub, so that they are inseparable therefrom when in use, the hub being provided with outwardly projecting or radiating spring-anchoring members adapted to positively engage the inner ends of the springs.

The rim or rim portion of the wheel, which has a suitable tire, and is preferably of the construction hereinafter described, is movable relatively to the hub in a plane at right angles to the axis of the wheel, the outer end portions of the springs 15 being positively secured or anchored to the rim so that the springs which are above the axis of the wheel are adapted to be extended by the weight of the hub and its load, while the springs that are below said axis are adapted to be compressed by the same means. A positive attachment between the end portions of the springs and the hub and rim is essential and is an important characteristic of my invention. The rim in the present embodiment of the invention includes an annular tire seat 16 to which the tire is suitably attached, said seat being provided at its inner side with inwardly projecting converging anchoring members with which the outer end portions of the springs 15 are positively engaged.

The inner anchoring members on the hub are preferably short studs having screw threaded shanks 17 engaged with tapped sockets formed in the hub, helically grooved portions 17ᵃ with which the inner end convolutions of the springs are engaged, and reduced outer portions 17ᵇ projecting into the interior of the spring and adapted to serve as stops, as hereinafter described. The outer spring-anchoring members are preferably composed of helically grooved collars 18 projecting inwardly from the tire seat 16, and engaging the outer convolutions of the springs, the said collars being bored and tapped to receive threaded bolts 18ᵃ which pass through apertures in circular caps 18ᵇ. Said caps are externally threaded and engaged with internal threads in orifices formed for their reception in the tire seat 16, the inner sides of the caps 18ᵇ forming bearings for the outer ends of the springs 15. The screws 18ᵃ have heads 18ᶜ which bear upon the outer side of the caps 18ᵇ.

It will be seen from the foregoing that the hub and rim are movable relatively to each other in a plane at right angles to the axis of the wheel. The combined strength of the springs is such that they are adapted to normally maintain the hub concentric with the rim. When the hub is depressed, the springs above it are extended by reason of their positive connection with the rim, the springs below the axis being at the same time compressed. Both the extended and the compressed springs therefore act simultaneously in returning the hub to its normal position.

To maintain the rim in a plane at right angles with the axis of the wheel and at the same time permit its movement relatively to the hub in said plane, I provide the rim with a pair of inwardly projecting annular flanges 19 which are located at opposite sides of the outer spring-anchoring members. I also provide the hub with outwardly projecting annular flanges 20 and 20$^a$ which are located at opposite sides of the inner spring-anchoring members and bear upon the outer sides of the inwardly projecting flanges 19. Portions of the flanges 19 are in sliding contact with corresponding portions of the flanges 20 and 20$^a$, the area of the contacting surfaces of said flanges being sufficient to maintain the rim in a plane at right angles with the axis of the wheel. The rim flanges 19 are preferably integral with the tire seat 16, said parts being preferably formed in a single casting. The hub flange 20 may be integral with the hub, the hub flange 20$^a$ being removably secured thereto by bolts 21 and 22.

The wheel rim, as here shown, includes in addition to the tire seat 16, a tire composed of a rigid inner section 23 which may be of wood, and an outer section or tread portion 24 which may be of suitable yielding material, such as leather, rubber, or a combination of rubber and fabric. The said tire may be secured to the tire seat 16 by any suitable means. I have here shown the tire seat provided at one edge with an integral outwardly projecting flange 25 and at its opposite edge with a detachable outwardly projecting flange 26 secured by bolts 27. The inner sides of the said flanges are ribbed to engage the corresponding portions of the tire portion 24. The inner surface of the rigid section 23 of the tire is provided with recesses 28 which receive the projecting bolt heads 18$^c$ and extend to one edge of the section 23 so that the latter may be moved edgewise to place on the tire seat.

The hub, the tire seat, and the flanges on said parts constitute a casing which entirely incloses the springs and their anchoring members, and excludes moisture and dirt therefrom, the casing being sufficiently tight to enable a lubricant, such as powdered plumbago, to be blown into the casing through suitable holes provided for that purpose, and thus deposited on the springs. Owing to the fact that the outer flanges or casing members 19 are in sliding contact with the inner flanges or casing members 20 and 20$^a$, the casing is telescopic.

The number of the springs and the strength of each individual spring is such that only a slight independent rotary movement of the rim relatively to the hub is possible, the amplitude of this movement being so slight as not to constitute an objection.

To prevent injurious flexure of the inner free convolutions of the springs, I provide the reduced portions on the inner anchoring members, said portions being preferably of tapered form and projecting into the springs, and constituting stops which limit the lateral flexure of the springs, thus preventing excessive or bending strain on the portions of the convolutions of the springs which are close to the inner anchoring members. The rim flanges 19 are preferably interrupted by openings 30, opposite sides of which are formed by webs or partitions 31 which connect the two flanges, the said partitions and the portions of the flanges connected thereby forming spoke-shaped containers through which the outer portions of the springs 15 extend. The positive engagement of the inner end portions of the springs with the hub, prevents any liability of separation of the springs from the hub by centrifugal or other force.

In assembling the parts of the wheel, let it be assumed that the hub flange 20$^a$ and the tire-securing flange 26 are removed, that the tire is not in place on the tire seat, and that the caps 18$^b$ are removed from the tire seat. The hub and rim are first placed in their proper relative positions, one of the rim flanges 19 bearing on the hub flange 20. The springs 15 are then introduced through the orifices in the tire seat and their inner end portions are screwed onto the grooved portions 17$^a$ of the inner anchoring members. The grooved collars 18 of the outer anchoring members are next screwed into the outer end portions of the springs and are then rigidly secured to the tire seat by the applications of the caps 18$^b$ and bolts 18$^a$. The hub flange 20$^a$ may be applied either before or after the application of the outer spring-anchoring members. The application of the tire in the manner already indicated completes the wheel. The removable tire-securing flange 26 is preferably on the same side of the wheel as the removable hub flange 20$^a$, the recesses 28 in the inner tire section opening toward the opposite side of the wheel, so that the tire and the hub flange 20$^a$ are both applied at the same side of the wheel.

The hub flanges located at opposite sides of the inner spring-anchoring members, and projecting outwardly therefrom, enable the diameter of the body of the hub to be reduced to the minimum, and also enable the springs to be made of maximum length and to extend across the contacting annular portions of the hub and rim flanges.

I claim:

1. A resilient wheel comprising a hub having a series of inner spring-anchoring members, and parallel outwardly projecting annular flanges at opposite sides of said members, one of said flanges being detachably secured, a rim movable relatively to the hub in a plane at right angles to the axis of the wheel, and including an annular tire seat and parallel inwardly projecting annular flanges integral therewith and in sliding contact with the hub flanges, said tire seat having a series of internally threaded orifices, externally threaded apertured caps screwed into said orifices, threaded bolts inserted in the apertures of said caps and having heads bearing on the caps, outer spring-anchoring members detachably engaged with said bolts, and a series of radial helical springs rigidly engaged at their end portions with said outer and inner anchoring members.

2. A resilient wheel comprising a hub having a series of inner spring-anchoring members, and parallel outwardly projecting annular flanges at opposite sides of said members, one of said flanges being detachably secured, a rim movable relatively to the hub in a plane at right angles to the axis of the wheel, and including an annular tire seat and parallel inwardly projecting annular flanges integral therewith and in sliding contact with the hub flanges, said tire seat having a series of internally threaded orifices, externally threaded apertured caps screwed into said orifices, threaded bolts inserted in the apertures of said caps and having heads bearings on the caps, outer spring-anchoring members detachably engaged with said bolts, a series of radial helical springs rigidly engaged at their end portions with said outer and inner anchoring members, the said tire seat having outwardly projecting tire-engaging flanges, one of which is detachably secured, and a tire composed of a rigid inner portion bearing on said seat and having recesses to receive the said bolt heads, and a yielding outer portion having its edges clamped between the said flanges and the edges of the rigid inner portion.

In testimony whereof I have affixed my signature, in presence of two witnesses.

ARTHUR B. CLIFFORD. [L. S.]

Witnesses:
L. C. HOLLIS, [L. S.]
ETHEL RANDALL. [L. S.]

---

Copies of this patent may be obtained for five cents each, by addressing the "Commissioner of Patents, Washington, D. C."